United States Patent
Wolrich et al.

(10) Patent No.: US 6,895,457 B2
(45) Date of Patent: May 17, 2005

(54) BUS INTERFACE WITH A FIRST-IN-FIRST-OUT MEMORY

(75) Inventors: Gilbert Wolrich, Framingham, MA (US); Debra Bernstein, Sudbury, MA (US); Matthew J. Adiletta, Worc., MA (US)

(73) Assignee: Intel Corporation, Santa Clara, CA (US)

( * ) Notice: Subject to any disclaimer, the term of this patent is extended or adjusted under 35 U.S.C. 154(b) by 41 days.

(21) Appl. No.: 10/664,202

(22) Filed: Sep. 16, 2003

(65) Prior Publication Data

US 2004/0073728 A1 Apr. 15, 2004

(51) Int. Cl.[7] .......................... G06F 13/00; G06F 12/00
(52) U.S. Cl. .................... 710/100; 710/52; 711/100; 370/912
(58) Field of Search .......................... 710/39, 52, 100, 710/260, 310.5, 300, 34; 709/230, 200, 245, 220; 711/154, 100, 101; 712/244, 225, 10, 220; 370/910, 912, 412, 444

(56) References Cited

U.S. PATENT DOCUMENTS

| 3,373,408 A | 3/1968 | Ling |
| 3,478,322 A | 11/1969 | Evans |
| 3,792,441 A | 2/1974 | Wymore et al. |

(Continued)

FOREIGN PATENT DOCUMENTS

| EP | 0 379 709 | 8/1990 |
| EP | 0 464 715 | 1/1992 |
| EP | 0 633 678 | 1/1995 |
| EP | 0 745 933 | 12/1996 |
| EP | 0 809 180 | 11/1997 |
| JP | 59111533 | 6/1984 |
| WO | WO 94/15287 | 7/1994 |
| WO | WO 97/38372 | 10/1997 |
| WO | WO 01/15718 | 3/2001 |
| WO | WO 01/16769 | 3/2001 |
| WO | WO 01/16770 | 3/2001 |
| WO | WO 01/16782 | 3/2001 |
| WO | WO 01/48596 | 7/2001 |
| WO | WO 01/48606 | 7/2001 |
| WO | WO 01/48619 | 7/2001 |
| WO | WO 01/50247 | 7/2001 |
| WO | WO 01/50679 | 7/2001 |

OTHER PUBLICATIONS

"Nomadic Threads: a migrating multithreaded approach to remote memory accesses in multiprocessors" by Jenks, S.; Gaudiot J.L. (abstract only) Publication Date: Oct. 20–23, 1996.*

"Overview of the START (*T) multithreaded computer" by Beckeerie, M.J. (abstract only) Publication Date: Feb. 22–26, 1993.*

U.S. Appl. No. 10/726,757, filed Dec. 3, 2003, Wolrich et al.
U.S. Appl. No. 10/684,078, filed Oct. 10, 2003, Wolrich et al.
U.S. Appl. No. 10/644,377, filed Aug. 20, 2003, Wolrich et al.
U.S. Appl. No. 10/643,438, filed Aug. 19, 2003, Bernstein et al.

(Continued)

Primary Examiner—Gopal C. Ray
(74) Attorney, Agent, or Firm—Fish & Richardson P.C.

(57) ABSTRACT

A system includes a multithreaded processor. The multithreaded processor includes a plurality of microengines, a memory controller, a first bus interface and a second bus interface. The second bus interface includes a first-in-first-out memory with a plurality of elements to store packet data and packet status. The system also includes a system bus coupled to the first bus interface and a network bus coupled to the second bus interface.

20 Claims, 7 Drawing Sheets

U.S. PATENT DOCUMENTS

| | | |
|---|---|---|
| 3,940,745 A | 2/1976 | Sajeva |
| 4,130,890 A | 12/1978 | Adam |
| 4,400,770 A | 8/1983 | Chan et al. |
| 4,514,807 A | 4/1985 | Nogi |
| 4,523,272 A | 6/1985 | Fukunaga et al. |
| 4,745,544 A | 5/1988 | Renner et al. |
| 4,866,664 A | 9/1989 | Burkhardt, Jr. et al. |
| 5,140,685 A | 8/1992 | Sipple et al. |
| 5,142,683 A | 8/1992 | Burkhardt, Jr. et al. |
| 5,155,831 A | 10/1992 | Emma et al. |
| 5,155,854 A | 10/1992 | Flynn et al. |
| 5,168,555 A | 12/1992 | Byers et al. |
| 5,173,897 A | 12/1992 | Schrodi et al. |
| 5,255,239 A | 10/1993 | Taborn et al. |
| 5,263,169 A | 11/1993 | Genusov et al. |
| 5,347,648 A | 9/1994 | Stamm et al. |
| 5,367,678 A | 11/1994 | Lee et al. |
| 5,390,329 A | 2/1995 | Gaertner et al. |
| 5,392,391 A | 2/1995 | Caulk, Jr. et al. |
| 5,392,411 A | 2/1995 | Ozaki |
| 5,392,412 A | 2/1995 | McKenna |
| 5,404,464 A | 4/1995 | Bennett |
| 5,404,482 A | 4/1995 | Stamm et al. |
| 5,432,918 A | 7/1995 | Stamm |
| 5,448,702 A | 9/1995 | Garcia, Jr. et al. |
| 5,450,351 A | 9/1995 | Heddes |
| 5,452,437 A | 9/1995 | Richey et al. |
| 5,459,842 A | 10/1995 | Begun et al. |
| 5,463,625 A | 10/1995 | Yasrebi |
| 5,467,452 A | 11/1995 | Blum et al. |
| 5,517,648 A | 5/1996 | Bertone et al. |
| 5,542,070 A | 7/1996 | LeBlanc et al. |
| 5,542,088 A | 7/1996 | Jennings, Jr. et al. |
| 5,544,236 A | 8/1996 | Andruska et al. |
| 5,550,816 A | 8/1996 | Hardwick et al. |
| 5,557,766 A | 9/1996 | Takiguchi et al. |
| 5,568,617 A | 10/1996 | Kametani |
| 5,574,922 A | 11/1996 | James |
| 5,592,622 A | 1/1997 | Isfeld et al. |
| 5,613,071 A | 3/1997 | Rankin et al. |
| 5,613,136 A | 3/1997 | Casavant et al. |
| 5,623,489 A | 4/1997 | Cotton et al. |
| 5,627,829 A | 5/1997 | Gleeson et al. |
| 5,630,130 A | 5/1997 | Perotto et al. |
| 5,644,623 A | 7/1997 | Gutledge |
| 5,649,157 A | 7/1997 | Williams |
| 5,659,687 A | 8/1997 | Kim et al. |
| 5,680,641 A | 10/1997 | Sidman |
| 5,689,566 A | 11/1997 | Nguyen |
| 5,699,537 A | 12/1997 | Sharangpani et al. |
| 5,717,898 A | 2/1998 | Kagan et al. |
| 5,721,870 A | 2/1998 | Matsumoto |
| 5,742,587 A | 4/1998 | Zornig et al. |
| 5,742,782 A | 4/1998 | Ito et al. |
| 5,742,822 A | 4/1998 | Motomura |
| 5,745,913 A | 4/1998 | Pattin et al. |
| 5,751,987 A | 5/1998 | Mahant-Shetti et al. |
| 5,761,507 A | 6/1998 | Govett |
| 5,761,522 A | 6/1998 | Hisanaga et al. |
| 5,781,774 A | 7/1998 | Krick |
| 5,784,649 A | 7/1998 | Begur et al. |
| 5,784,712 A | 7/1998 | Byers et al. |
| 5,796,413 A | 8/1998 | Shipp et al. |
| 5,797,043 A | 8/1998 | Lewis et al. |
| 5,809,235 A | 9/1998 | Sharma et al. |
| 5,809,530 A | 9/1998 | Samra et al. |
| 5,812,868 A | 9/1998 | Moyer et al. |
| 5,828,746 A | 10/1998 | Ardon |
| 5,828,863 A | 10/1998 | Barrett et al. |
| 5,832,215 A | 11/1998 | Kato et al. |
| 5,835,755 A | 11/1998 | Stellwagen, Jr. |
| 5,854,922 A | 12/1998 | Gravenstein et al. |
| 5,860,158 A | 1/1999 | Pai et al. |
| 5,886,992 A | 3/1999 | Raatikaien et al. |
| 5,887,134 A | 3/1999 | Ebrahim |
| 5,890,208 A | 3/1999 | Kwon |
| 5,892,979 A | 4/1999 | Shiraki et al. |
| 5,905,876 A | 5/1999 | Pawlowski et al. |
| 5,905,889 A | 5/1999 | Wilhelm, Jr. |
| 5,915,123 A | 6/1999 | Mirsky et al. |
| 5,937,187 A | 8/1999 | Kosche et al. |
| 5,938,736 A | 8/1999 | Muller et al. |
| 5,940,612 A | 8/1999 | Brady et al. |
| 5,940,866 A | 8/1999 | Chisholm et al. |
| 5,946,487 A | 8/1999 | Dangelo |
| 5,948,081 A | 9/1999 | Foster |
| 5,958,031 A | 9/1999 | Kime |
| 5,961,628 A | 10/1999 | Nguyen et al. |
| 5,970,013 A | 10/1999 | Fischer et al. |
| 5,978,838 A | 11/1999 | Mohammed et al. |
| 5,983,274 A | 11/1999 | Hyder et al. |
| 6,012,151 A | 1/2000 | Mano |
| 6,014,729 A | 1/2000 | Lannan et al. |
| 6,023,742 A | 2/2000 | Ebeling et al. |
| 6,058,168 A | 5/2000 | Braband |
| 6,067,585 A | 5/2000 | Hoang |
| 6,070,231 A | 5/2000 | Ottinger |
| 6,072,781 A | 6/2000 | Feeney et al. |
| 6,073,215 A | 6/2000 | Snyder |
| 6,079,008 A | 6/2000 | Clery, III |
| 6,085,215 A | 7/2000 | Ramakrishnan et al. |
| 6,085,294 A | 7/2000 | Van Doren et al. |
| 6,092,127 A | 7/2000 | Tausheck |
| 6,092,158 A | 7/2000 | Harriman et al. |
| 6,112,016 A | 8/2000 | MacWilliams et al. |
| 6,134,665 A | 10/2000 | Klein et al. |
| 6,141,689 A | 10/2000 | Yasrebi |
| 6,141,765 A | 10/2000 | Sherman |
| 6,144,669 A | 11/2000 | Williams et al. |
| 6,145,054 A | 11/2000 | Mehrotra et al. |
| 6,157,955 A | 12/2000 | Narad et al. |
| 6,160,562 A | 12/2000 | Chin et al. |
| 6,182,177 B1 | 1/2001 | Harriman |
| 6,195,676 B1 | 2/2001 | Spix et al. |
| 6,199,133 B1 | 3/2001 | Schnell |
| 6,201,807 B1 | 3/2001 | Prasanna |
| 6,212,542 B1 | 4/2001 | Kahle et al. |
| 6,212,611 B1 | 4/2001 | Nizar et al. |
| 6,216,220 B1 | 4/2001 | Hwang |
| 6,223,207 B1 | 4/2001 | Lucovsky et al. |
| 6,223,238 B1 | 4/2001 | Meyer et al. |
| 6,223,279 B1 | 4/2001 | Nishimura et al. |
| 6,247,025 B1 | 6/2001 | Bacon |
| 6,256,713 B1 | 7/2001 | Audityan et al. |
| 6,272,616 B1 | 8/2001 | Fernando et al. |
| 6,275,505 B1 | 8/2001 | O'Loughlin et al. |
| 6,279,113 B1 | 8/2001 | Vaidya |
| 6,289,011 B1 | 9/2001 | Seo et al. |
| 6,298,370 B1 | 10/2001 | Tang et al. |
| 6,307,789 B1 | 10/2001 | Wolrich et al. |
| 6,324,624 B1 | 11/2001 | Wolrich et al. |
| 6,345,334 B1 | 2/2002 | Nakagawa et al. |
| 6,347,344 B1 | 2/2002 | Baker et al. |
| 6,356,962 B1 | 3/2002 | Kasper |
| 6,360,262 B1 | 3/2002 | Guenthner et al. |
| 6,373,848 B1 | 4/2002 | Allison et al. |
| 6,389,449 B1 | 5/2002 | Nermirovsky et al. |
| 6,393,483 B1 | 5/2002 | Latif et al. |
| 6,415,338 B1 | 7/2002 | Habot |
| 6,426,940 B1 | 7/2002 | Seo et al. |
| 6,427,196 B1 | 7/2002 | Adiletta et al. |

| | | | |
|---|---|---|---|
| 6,430,626 B1 | 8/2002 | Witkowski et al. | |
| 6,434,145 B1 | 8/2002 | Opsasnick et al. | |
| 6,463,072 B1 | 10/2002 | Wolrich et al. | |
| 6,532,509 B1 | 3/2003 | Wolrich et al. | |
| 6,552,826 B2 | 4/2003 | Adler et al. | |
| 6,560,667 B1 | 5/2003 | Wolrich et al. | |
| 6,577,542 B2 | 6/2003 | Wolrich et al. | |
| 6,584,522 B1 | 6/2003 | Wolrich et al. | |
| 6,587,906 B2 | 7/2003 | Wolrich et al. | |
| 6,606,704 B1 * | 8/2003 | Adiletta et al. | 712/248 |
| 6,625,654 B1 * | 9/2003 | Wolrich et al. | 709/230 |
| 6,631,430 B1 | 10/2003 | Wolrich et al. | |
| 6,631,462 B1 | 10/2003 | Wolrich et al. | |
| 6,661,794 B1 * | 12/2003 | Wolrich et al. | 370/394 |
| 6,667,920 B2 | 12/2003 | Wolrich et al. | |
| 6,668,317 B1 * | 12/2003 | Bernstein et al. | 712/245 |
| 6,671,827 B2 * | 12/2003 | Guilford et al. | 714/38 |
| 6,681,300 B2 | 1/2004 | Wolrich et al. | |
| 6,694,380 B1 | 2/2004 | Wolrich et al. | |

OTHER PUBLICATIONS

U.S. Appl. No. 10/615,500, filed Jul. 8, 2003, Adiletta.
U.S. Appl. No. 10/615,280, filed Jul. 8, 2003, Wolrich et al.
U.S. Appl. No. 10/440,079, filed May 15, 2003, Wolrich et al.
U.S. Appl. No. 10/208,264, filed Jul. 30, 2002, Adiletta et al.
U.S. Appl. No. 09/476,303, filed Dec. 30, 1999, Wolrich et al.
U.S. Appl. No. 09/475,614, filed Dec. 30, 1999, Wolrich et al.
U.S. Appl No. 09/473,571, filed Dec. 28, 1999, Wolrich et al.
U.S. Appl. No. 09/387,109, filed Aug. 31, 1999, Adiletta et al.
Byrd et al., "Multithread Processor Architectures," *IEEE Spectrum*, vol. 32, No. 8, New York, Aug. 1, 1995, pp. 38–46.
Doyle et al., *Microsoft Press Computer Dictionary*, $2^{nd}$ ed., Microsoft Press, Redmond, Washington, USA, 1994, p. 326.
Fillo et al., "The M–Machine Multicomputer," IEEE Proceedings of MICRO–28, 1995, pp. 146–156.

Gomez et al., "Efficient Multithreaded User–Space Transport for Network Computing: Design and Test of the TRAP Protocol," *Journal of Parallel and Distributed Computing*, Academic Press, Duluth, Minnesota, USA, vol. 40, No. 1, Jan. 10, 1997, pp. 103–117.
Haug et al., "Reconfigurable hardware as shared resource for parallel threads," IEEE Symposium on FPGAs for Custom Computing Machines, 1998.
Hauser et al., "Garp: a MIPS processor with a reconfigurable coprocessor," Proceedings of the $5^{th}$ Annual IEEE Symposium on Field–Programmable Custom Computing Machines, 1997.
Hyde, R., "Overview of Memory Management," *Byte*, vol. 13, No. 4, 1998, pp. 219–225.
Litch et al., "StrongARMing Portable Communications," IEEE Micro, 1998, pp. 48–55.
Schmidt et al., "The Performance of Alternative Threading Architectures for Parallel Communication Subsystems," Internet Document, *Online!*, Nov. 13, 1998.
Thistle et al., "A Processor Architecture for Horizon," IEEE, 1998, pp. 35–41.
Tremblay et al., "A Three Dimensional Register File for Superscalar Processors," IEEE Proceedings of the $28^{th}$ Annual Hawaii International Conference on System Sciences, 1995, pp. 191–201.
Trimberger et al, "A time–multiplexed FPGA," Proceedings of the $5^{th}$ Annual IEEE Symposium on Field–Programmable Custom Computing Machines, 1998.
Turner et al., "Design of a High Performance Active Router," Internet Document, *Online*, Mar. 18, 1999.
Vibhatavanijt et al., "Simultaneous Multithreading–Based Routers," Proceedings of the 2000 International Conference of Parallel Processing, Toronto, Ontario, Canada, Aug. 21–24, 2000, pp. 362–359.
Wazlowski et al., "PRSIM–II computer and architecture," IEEE Proceedings, Workshop on FPGAs for Custom Computing Machines, 1993.

* cited by examiner

BUS INTERFACE WITH A FIRST-IN-FIRST-OUT MEMORY

U.S. patents cited herein are each hereby incorporated by reference in their entirety.

BACKGROUND OF THE INVENTION

A network device receives packets of information from a communication media access control device, e.g., an Ethernet controller. Each packet may contain data and the destination address of that data. Each receiving port of the device has a "ready signal" which indicates that a predetermined number of bytes or the last byte of the packet has been received. The predetermined number of bytes is usually 64 because that is the size of a minimum Ethernet packet. A high percentage of Ethernet packets (approximately 80%) are minimum length packets, e.g., 64 bytes. Optimizing for 64 byte packets by requesting 64 bytes increases the bandwidth of the processor.

SUMMARY OF THE INVENTION

According to one aspect of the invention, a method is described of receiving bytes of data from a media device includes issuing N consecutive requests, each for M bytes, to the media device and receiving N-1 responses of M bytes of data from the media device.

Other advantages will become apparent from the following description and from the claims.

DESCRIPTION OF THE PREFERRED EMBODIMENTS

Figure 1:
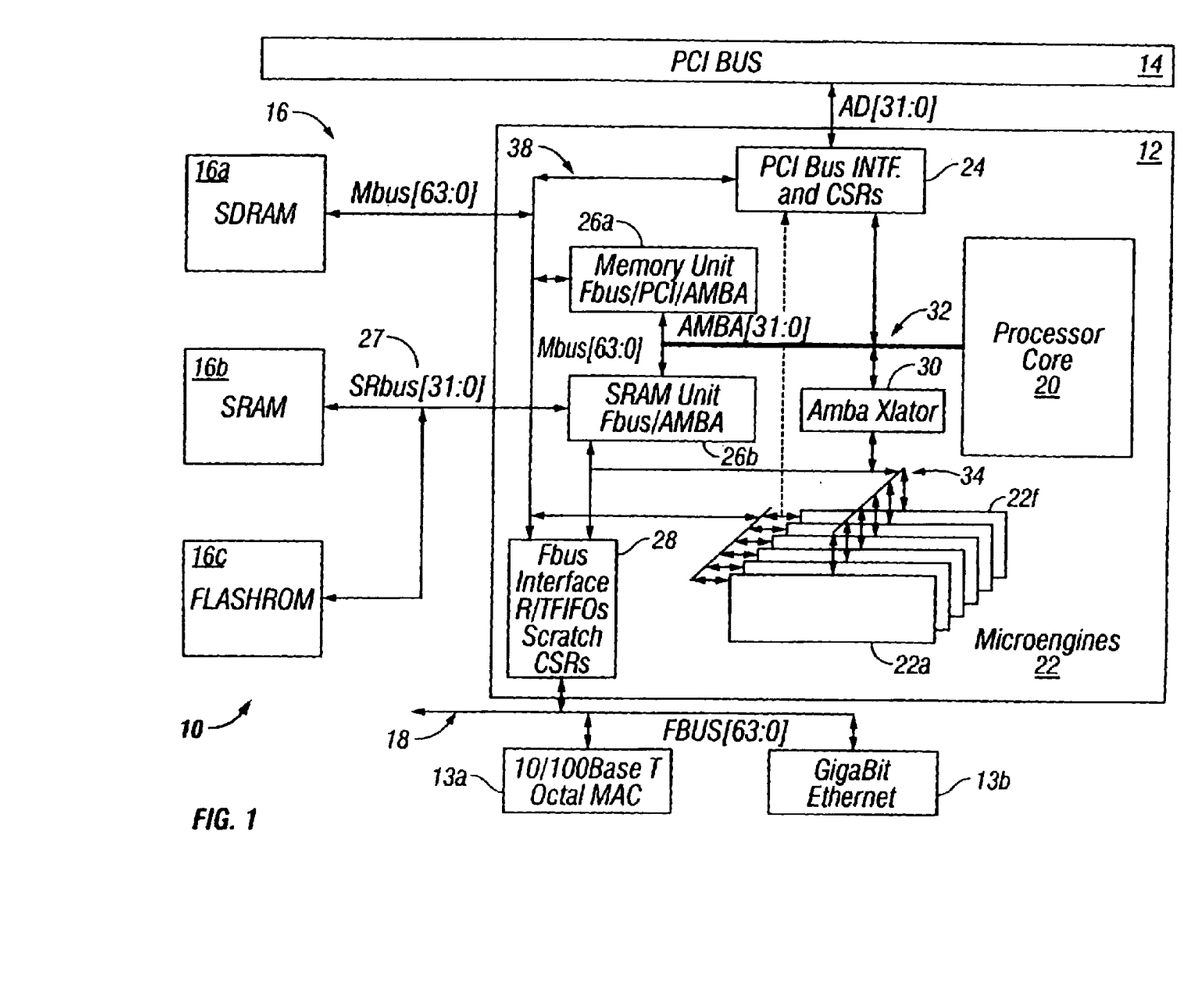
FIG. 1 is a block diagram of a communication system employing a hardware-based multithreaded processor.

Referring to FIG. 1, a communication system 10 includes a parallel, hardware-based multithreaded processor 12. The hardware-based multithreaded processor 12 is coupled to a bus such as a PCI bus 14, a memory system 16, and a second bus 18. The processor 12 includes a bus interface 28 that couples the processor 12 to the second bus 18. Bus interface 28 in one embodiment couples the processor 12 to the so-called FBUS 18 (FIFO (first-in, first-out) bus). The FBUS interface (FBI) 28 is responsible for controlling and interfacing the processor 12 to the FBUS 18. The FBUS 18 is a 64-bit wide FIFO bus, used to interface to MAC devices 13. The system 10 is especially useful for tasks that can be broken into parallel subtasks or functions. Specifically, a hardware-based multithreaded processor 12 is useful for tasks that are bandwidth oriented rather than latency oriented. The hardware-based multithreaded processor 12 has multiple microengines 22 each with multiple hardware controlled threads that can be simultaneously active and independently work on a task.

The hardware-based multithreaded processor 12 also includes a central controller (also called processor or microprocessor) 20 that assists in loading microcode control for other resources of the hardware-based multithreaded processor 12 and performs other general purpose computer type functions such as handling protocols, exceptions, and extra support for packet processing where the microengines 22 pass the packets off for more detailed processing such as in boundary conditions. In one embodiment, the processor 20 is a Strong Arm® (Arm is a trademark of ARM Limited, United Kingdom) based architecture. The general purpose microprocessor 20 has an operating system. Through the operating system, the processor 20 can call functions to operate on microengines 22a–22f. The processor 20 can use any supported operating system, preferably a real time operating system. For the core processor 20 implemented as a Strong Arm architecture, operating systems such as, MicrosoftNT real-time, VXWorks and μCUS, a freeware operating system available over the Internet, can be used.

The hardware-based multithreaded processor 12 also includes a plurality of function microengines 22a–22f. Functional microengines (microengines) 22a–22f each maintain a plurality of program counters in hardware and states associated with the program counters. Effectively, a corresponding plurality of sets of threads can be simultaneously active on each of the microengines 22a–22f while only one is actually operating at any one time.

In one embodiment, there are six microengines 22a–22f as shown. Each microengines 22a–22f has capabilities for processing four hardware threads. The six microengines 22a–22f operate with shared resources including memory system 16 and bus interfaces 24 and 28. The memory system 16 includes a Synchronous Dynamic Random Access Memory (SDRAM) controller 26a and a Static Random Access Memory (SRAM) controller 26b. SDRAM 16a and SDRAM controller 26a are typically used for processing large volumes of data, e.g., processing of network payloads from network packets. SRAM 16b and SRAM controller 26b are used in a networking implementation for low latency, fast access tasks, e.g., accessing look-up tables, memory for the core processor 20, and so forth.

The six microengines 22a–22f access either the SDRAM 16a or SRAM 16b based on characteristics of the data. Thus, low latency, low bandwidth data is stored in and fetched from SRAM 16b, whereas higher bandwidth data for which latency is not as important, is stored in and fetched from SDRAM 16a. The microengines 22a–22f can execute memory reference instructions to either the SDRAM controller 26a or the SRAM controller 26b.

Advantages of hardware multithreading can be explained by SRAM or SDRAM memory accesses. As an example, an SRAM access requested by a Thread_0, from a microengine 22a–22f will cause the SRAM controller 26b to initiate an access to the SRAM 16b. The SRAM controller 26b controls arbitration for the SRAM bus 27, accesses the SRAM 16b, fetches the data from the SRAM 16b, and returns data to the requesting microengine 22a–22f. During an SRAM 16b access, if the microengine, e.g., 22a, had only a single thread that could operate, that microengine would be dormant until data was returned from the SRAM 16b. The hardware context swapping within each of the microengines 22a–22f enables other contexts with unique program counters to execute in that same microengine. Thus, another thread, e.g., Thread_1, can function while the first thread, e.g., Thread_0, is awaiting the read data to return. During execution, Thread_1 may access the SDRAM memory 16a. While Thread_1 operates on the SDRAM unit 26a, and Thread_0 is operating on the SRAM unit 26b, a new thread, e.g., Thread_2, can now operate in the microengine 22a. Thread_2 can operate for a certain amount of time until it needs to access memory or perform some other long latency operation, such as making an access to a bus interface. Therefore, simultaneously, the processor 12 can have a bus operation, SRAM operation, and SDRAM operation all being completed or operated upon by one microengine 22a and have one more thread available to process more work in the data path.

The hardware context swapping also synchronizes completion of tasks. For example, two threads could hit the same shared resource, e.g., SRAM 16b. Each one of these separate functional units, e.g., the FBI 28, the SRAM controller 26b, and the SDRAM controller 26a, when they complete a requested task from one of the microengine thread contexts reports back a flag signaling completion of an operation. When the flag is received by the microengine 22a–22f, the microengine 22a–22f can determine which thread to turn on.

Each of the functional units, e.g., the FBI 28, the SRAM controller 26b, and the SDRAM controller 26a, are coupled to one or more internal buses. The internal buses are dual, 32-bit buses (i.e., one bus for read and one for write). The hardware-based multithreaded processor 12 also is constructed such that the sum of the bandwidths of the internal buses in the processor 12 exceeds the bandwidth of external buses coupled to the processor 12. The processor 12 includes an internal core processor bus 32, e.g., an ASB bus (Advanced System Bus), that couples the processor core 20 to the memory controller 26a, 26b and to an ASB translator 30. The ASB bus 32 is a subset of the so-called AMBA bus that is used with the Strong Arm processor core. The processor 12 also includes a private bus 34 that couples the microengine units 22 to SRAM controller 26b, ASB translator 30, and FBI 28. A memory bus 38 couples the memory controllers 26a, 26b to the bus interfaces 24 and 28 and memory system 16 including a flashrom 16c used for boot operations and so forth.

One example of an application for the hardware-based multithreaded processor 12 is as a network processor. As a network processor, the hardware-based multithreaded processor 12 interfaces to network devices such as a media access controller (MAC) device, e.g., a 10/100 BaseT Octal MAC 13a or a Gigabit Ethernet device 13b. In general, as a network processor, the hardware-based multithreaded processor 12 can interface to any type of communication device or interface that receives/sends large amounts of data. If communication system 10 functions in a networking application, it could receive a plurality of network packets from the devices 13a, 13b and process those packets in a parallel manner. With the hardware-based multithreaded processor 12, each network packet can be independently processed.

Figure 2A:
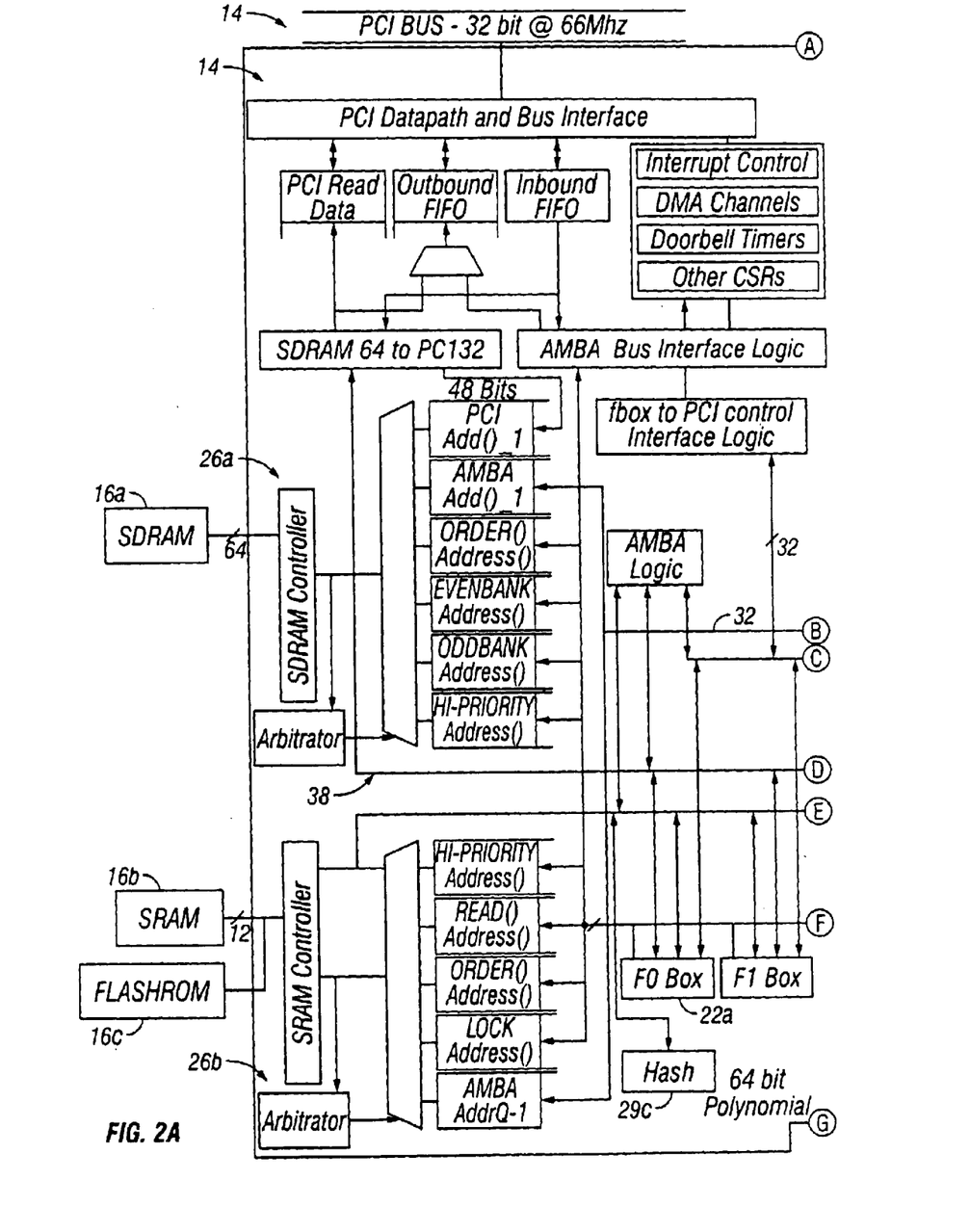
FIG. 2 is a detailed block diagram of the hardware-based multithreaded processor of FIG. 1.
Figure 2B:
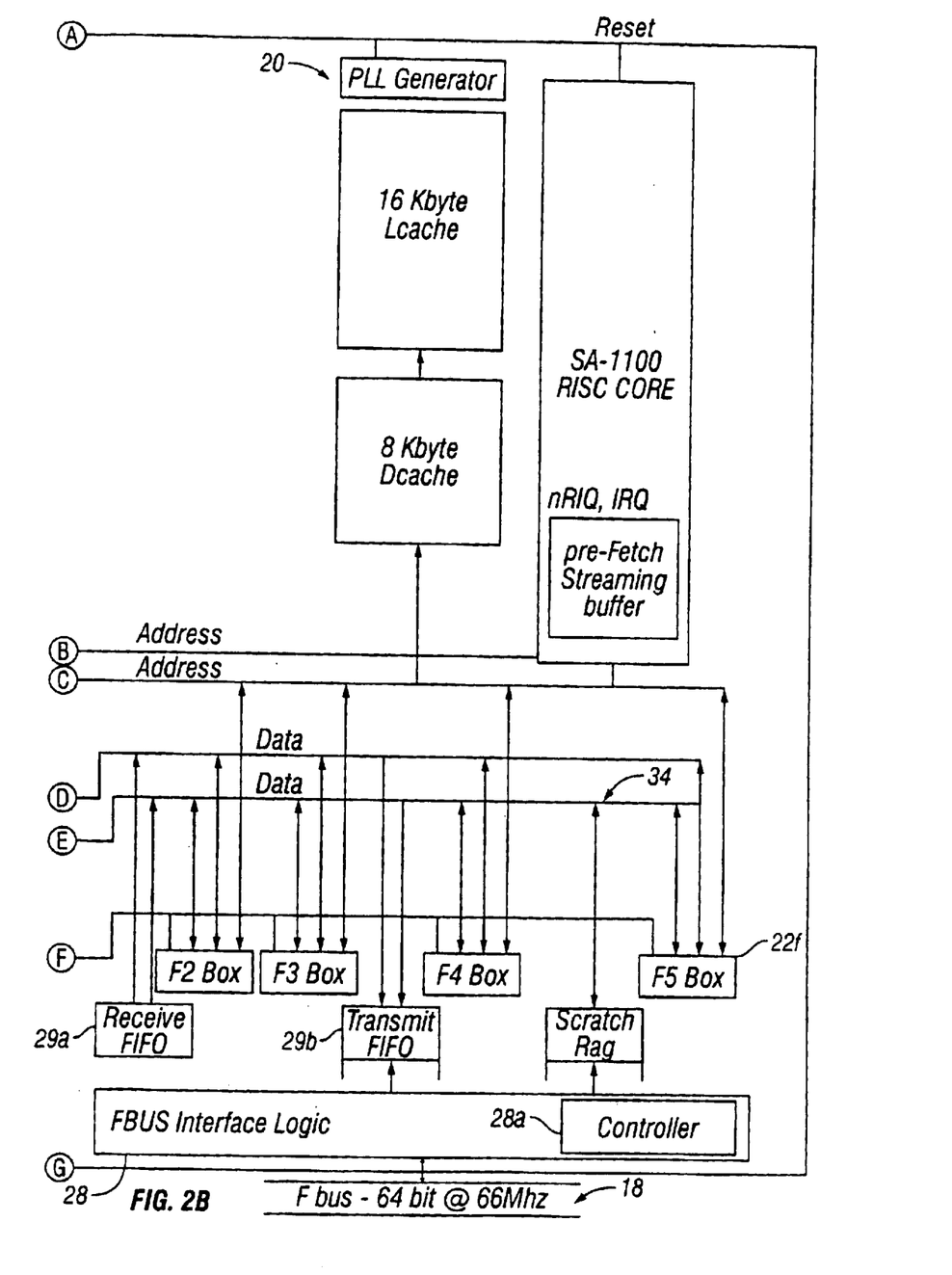

Referring to FIG. 2, the FBI 28 supports Transmit and Receive flags for each port that a MAC device supports, along with an Interrupt flag indicating when service is warranted. The FBI 28 also includes a controller 28a that performs header processing of incoming packets from the FBUS 18. The controller 28a extracts the packet headers and performs a microprogrammable source/destination/protocol hashed lookup (used for address smoothing) in an SRAM unit 26b. If the hash does not successfully resolve, the packet header is sent to the processor core 20 for additional processing. The FBI 28 supports the following internal data transactions:

| FBUS unit | (Shared bus SRAM) | to/from microengine |
| FBUS unit | (via private bus) | writes from SDRAM Unit |
| FBUS unit | (via Mbus) | Reads to DRAM |

The FBUS 18 is a standard industry bus and includes a data bus, e.g., 64 bits wide, and sideband control for address and read/write control. The FBI 28 provides the ability to input large amounts of data using a series of input and output FIFOs 29a–29b. From the FIFOs 29a–29b, the microengines 22a–22f fetch data from or command a SDRAM controller 26a to move data from a receive FIFO in which data has come from a device on bus 18 into the FBI 28. The data can be sent through SDRAM controller 26a to SDRAM memory 16a, via a direct memory access. Similarly, the microengines 22a–22f can move data from the SDRAM 26a to the FBI 28 and out to the FBUS 18 via the FBI 28.

Figure 3A:
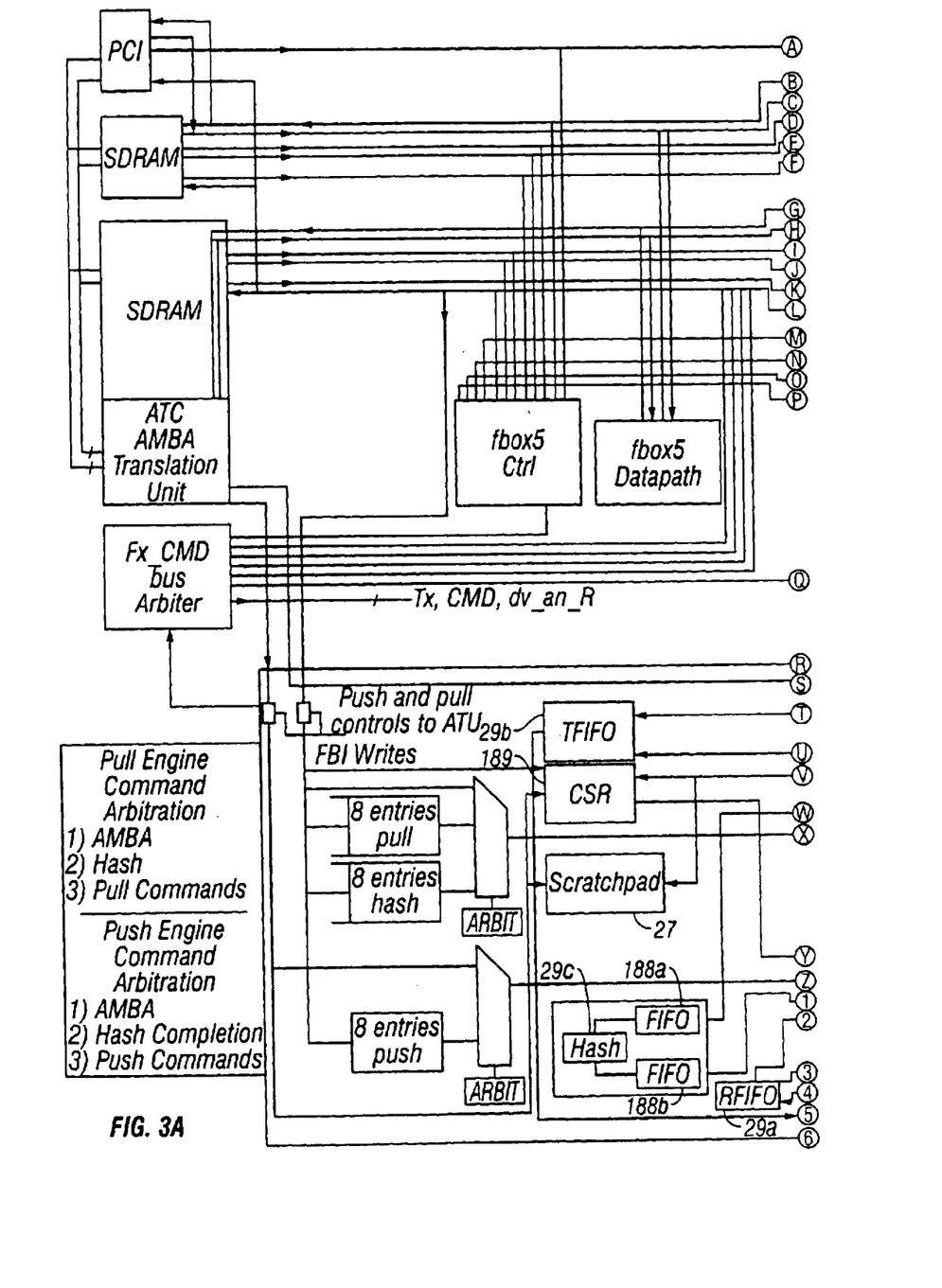
FIG. 3 is a block diagram of a communication bus interface in the processor of FIG. 1.
Figure 3B:
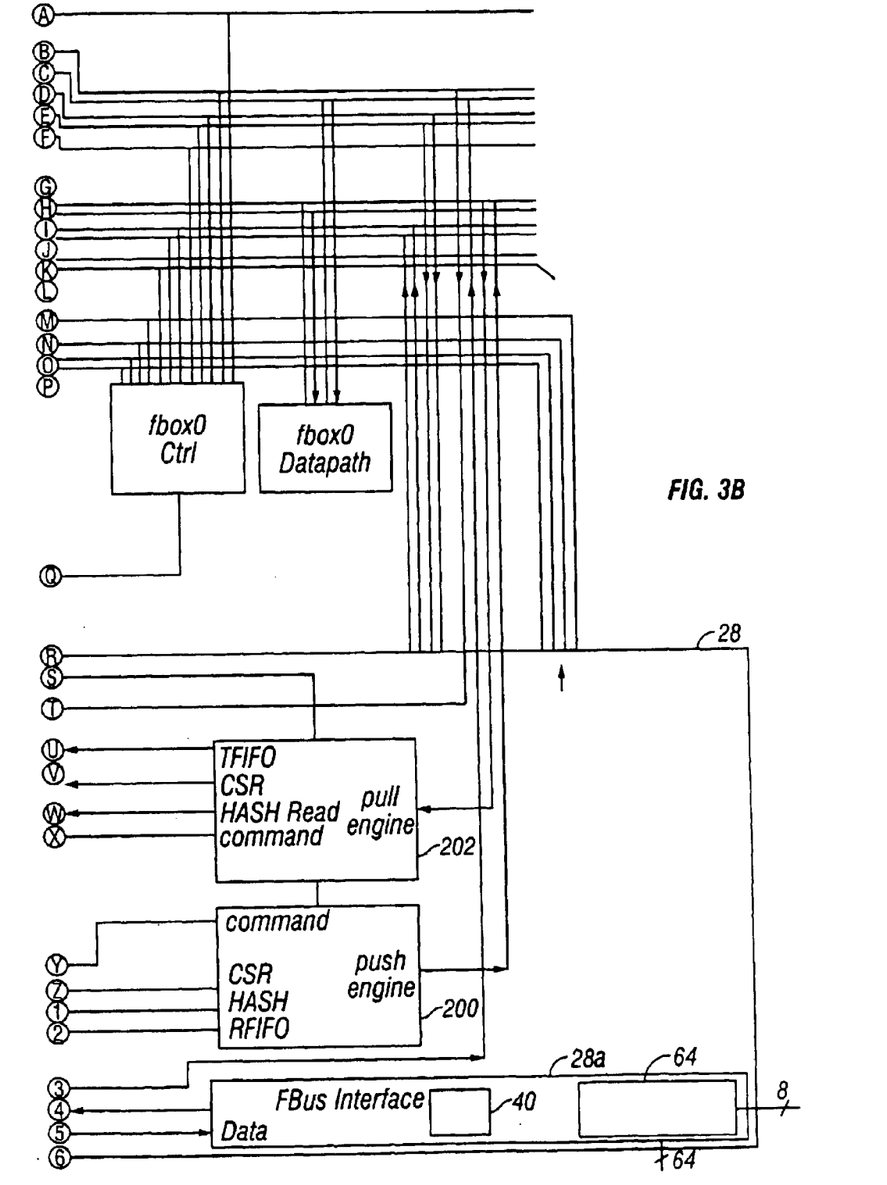

Referring to FIG. 3, communication between the microengines 22a–22f and the FBI 28 is shown. The FBI 28 in a network application can perform header processing of incoming packets from the FBUS 18. A key function that the FBI 28 performs is extraction of packet headers, and a microprogrammable source/destination/protocol hashed lookup in SRAM 26b. If the hash does not successfully resolve, the packet header is promoted to the core processor 20 for more sophisticated processing.

The FBI 28 contains a transmit FIFO 29b, a receive FIFO 29a, a hash unit 29c, and FBI control and status registers (CSR) 189. These four units communicate with the microengines 22a–22f via a time-multiplexed access to the SRAM bus 38 that is connected to transfer registers in the microengines 22a–22f. All data transfers to and from the microengines 22a–22f are via the transfer registers. The FBI 28 includes a push state machine 200 for pushing data into the transfer registers during the time cycles which the SRAM 26b is not using the SRAM data bus (part of bus 38) and a pull state machine 202 for fetching data from the transfer registers in the respective microengine 22a–22f.

The hash unit 29c includes a pair of FIFOs 188a and 188b. The hash unit 29c determines that the FBI 28 received an FBI_hash request from a microengine 22a–22f. The hash unit 29c fetches hash keys from the requesting microengine 22a–22f. After the keys are fetched and hashed, the indices are delivered back to the requesting microengine 22a–22f. Up to three hashes are performed under a single FBI_hash request. The buses 34 and 38 are each unidirectional: SDRAM_push/pull_data, and Sbus_push/pull_data. Each of these buses requires control signals which will provide read/write controls to the appropriate microengine 22a–22f transfer registers.

Figure 4A:
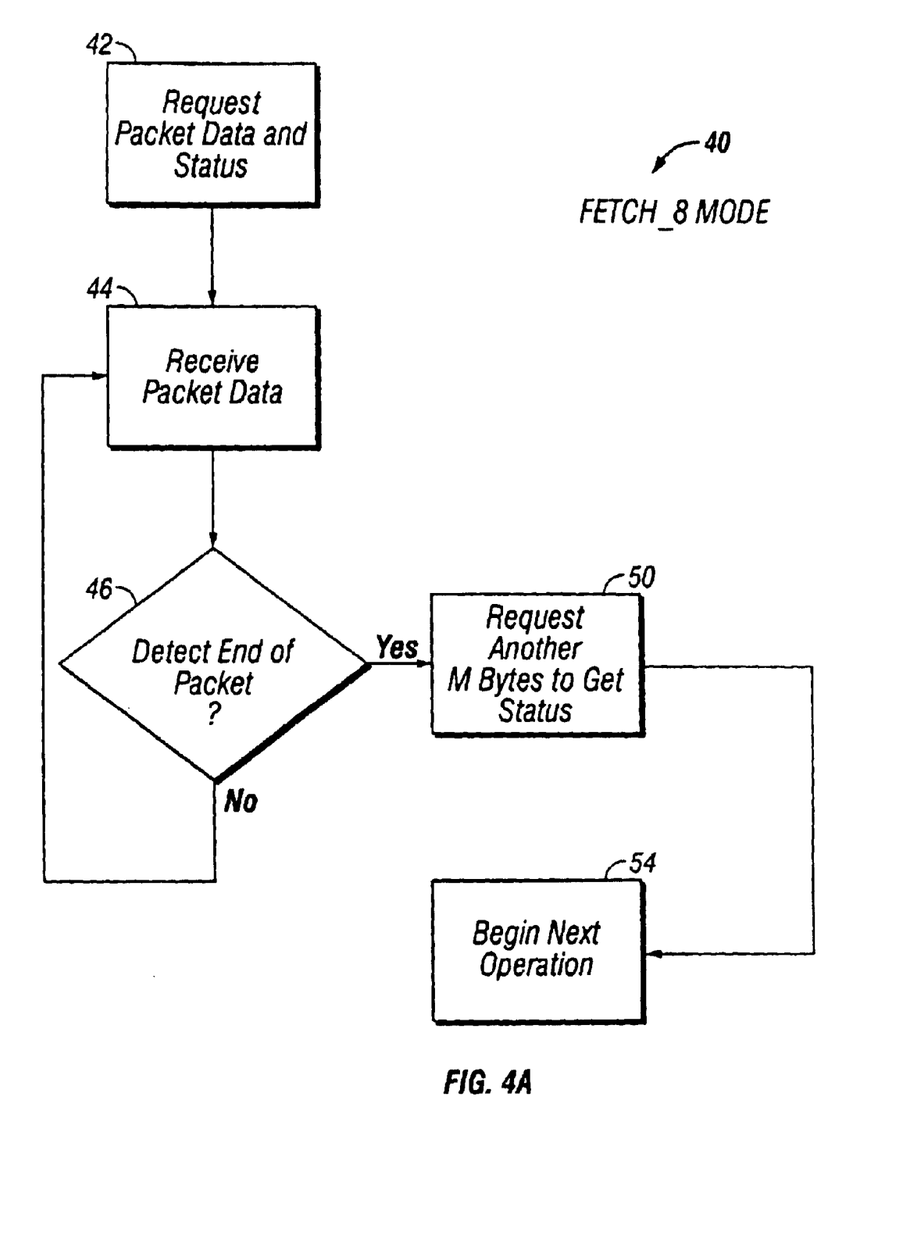
FIGS. 4A and 4B are flowcharts illustrating the operation of a bus interface.
Figure 4B:
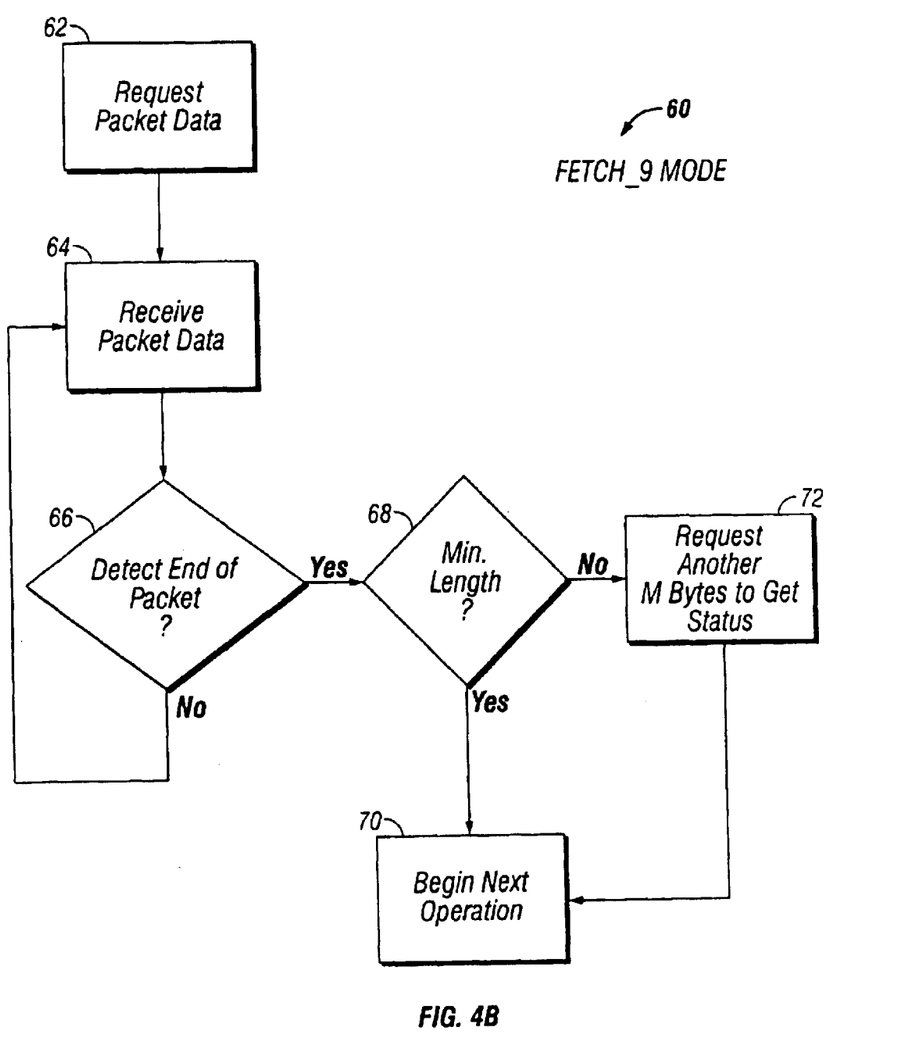

Referring to FIGS. 4A and 4B, the FBI 28 may operate 40 in Fetch_N mode, e.g., Fetch_8 mode, as shown in FIG. 4A, where the value of N may be programmable. In Fetch_8 mode, the FBI 28 requests 42 packet data and status from a MAC device 13, e.g., the 10/100 BaseT Octal MAC 13a or the Gigabit Ethernet device 13b over a 64-bit bus, e.g., FBUS 18. In Fetch_N mode, the FBI 28 issues 42 N requests, each for M bytes, e.g., eight bytes (64 bits, one quadword), over N clock cycles (one request per cycle). The MAC device 13 responds to each request, and the FBI 28 receives 44 the M requested bytes in the receive FIFO 29a four cycles after requesting 42 the data and waits to detect 46 an end of packet indicator. In Fetch_8 mode, after receiving 44 all the requested bytes, e.g., 64 and getting the end of packet indicator, the FBI 28 requests 50 and receives another M bytes to obtain the status for minimum length packets, which uses additional clock cycles. The FBI 28 can process 54 a next operation.

Referring to FIG. 4B, the FBI 28 may operate 60 in Fetch_9 mode. In Fetch_9 mode, the FBI 28 requests 62 and receives 64 bytes generally as described above. After eleven cycles, the FBI 28 has received 64 all requested bytes. The receive FIFO 29a contains sixteen elements, each capable of storing 64 bytes of packet data plus sixteen additional bytes (two quadwords) for associated packet status. The first 64 bytes of received packet data are stored in one element of the receive FIFO 29*a* and the last eight bytes are stored in the first status quadword part of the receive FIFO 29*a* for that element. In this way, for a minimum sized packet (64 bytes), the FBI 28 already has the status associated with the packet from the initial packet data requests 62 and does not have to wait four additional cycles to request 62 and receive 64 the status.

The FBI 28 checks 66 the requested bytes by looking for an end-of-packet indicator at the end of the first 64 bytes. If the packet is a minimum length packet 68, the FBI 28 begins 70 its next operation, having received 64 a complete packet of data and its status. If the packet is between 64 and 72 bytes, the FBI 28 requests 72 another eight bytes so as to receive 72 the packet status four cycles later. These eight additional bytes are stored in the second status quadword for that element in the receive FIFO 29*a*. The FBI 28 begins 70 its next operation having now received a complete packet of data and its status.

Still referring to FIG. 4B, the FBI 28 may operate in Fetch_10 mode. Fetch_10 mode optimizes bandwidth for a high frequency of packets having between 64 and 80 bytes, e.g., packets with VLAN (virtual local area network) tags from the Gigabit Ethernet device 13*b*. In Fetch_10 mode, the FBI 28 requests 62 and receives 64 bytes as described above in FIG. 4B, except the FBI 28 issues 62 ten requests, each for M bytes, over ten clock cycles (one request per cycle). The first 64 bytes are stored in one element of the receive FIFO 29*a*, bytes 65–72 in the first status quadword of that element, and bytes 73–80 in the second status quadword of that element. As above, the FBI 28 checks 66, 68 to see if the receive FIFO 29*a* contains the packet data and its status. If so, the FBI 28 begins 48 its next operation 70. If not, it requests 72 another M bytes. Once received, this quadword may be stored in a third status quadword of that element or in another receive FIFO 29*a* element. The FBI 28 then begins 70 its next operation having now received a complete packet of data and its status.

What is claimed is:

1. A system comprising:
    a multithreaded processor comprising a plurality of microengines, a memory controller, a first bus interface and a second bus interface, the second bus interface comprising a first-in-first-out memory with a plurality of elements to store packet data and packet status;
    a system bus coupled to the first bus interface;
    a network bus coupled to the second bus interface;
    a media access control device coupled to the network bus; and
    a memory system coupled to the memory controller.

2. The system of claim 1, wherein the second bus interface comprises a controller and a first-in-first-out memory operable to store data from the memory system to be sent to the second bus.

3. The system of claim 1, wherein each microengine has a plurality of hardware-controlled threads operable to be active simultaneously.

4. The system of claim 1, wherein the second bus interface is operable to issue N requests for packet data and packet status to the media access control device coupled to the network bus, each request for M bytes; receive packet data and packet status and store received packet data and packet status in an element of the first-in-first-out memory; detect an end-of-packet indicator; determine if the last M received bytes contain data or packet status; and if the last M received bytes contain packet data, issue other request of M bytes to retrieve packet status.

5. A processor comprising:
    a bus interface coupled to a bus, the bus interface comprising first-in-first-out memories;
    a plurality of microengines coupled to the bus interface, each microengine having a plurality of hardware-controlled threads operable to be active simultaneously, the microengines being operable to transfer data to the first-in-first-out memories;
    a first memory controller; and
    a second memory controller.

6. The processor of claim 5, wherein bus interface is coupled to a bus, the bus being coupled to a media access control device.

7. The processor of claim 5, wherein each microengine maintains a plurality of program counters and states associated with the program counters.

8. The processor of claim 5, wherein a first thread of a microengine is operable to request access to a memory coupled to the first memory controller, and a second thread of the microengine is operable while the first thread waits for data from the memory.

9. The processor of claim 8, wherein the first memory controller sends a signal to the microengine when the first memory controller completes the requested access.

10. The processor of claim 8, wherein the second thread of the microengine is operable to request access to a second memory coupled to the second memory controller, and a third thread of the microengine operates while the first and second threads wait for data from the first and second memories.

11. The processor of claim 10, wherein the third thread accesses the first bus interface while the first and second threads wait for data from the first and second memories.

12. The processor of claim 10, wherein a fourth thread of the microengine processes data in a data path of the network processor.

13. The processor of claim 5, wherein the microengines access either the first or second memory controllers based on characteristics of data.

14. The processor of claim 5, wherein the bus interface is coupled to first and second network devices, the bus interface being operable to receive a plurality of packets from the first and second network devices, the microengines being operable to process the packets in parallel.

15. The processor of claim 14, being operable to process each packet independently.

16. The processor of claim 14, wherein the bus interface stores transmit, receive and interrupt flags for each network device.

17. The processor of claim 5, wherein the bus interface comprises a first-in-first-out memory operable to store packet data and packet status from the bus.

18. The processor of claim 17, wherein the bus interface is operable to issue N requests for packet data and packet status to a network device coupled to the bus, each request for M bytes; receive packet data and packet status and store received packet data and packet status in an element of the first-in-first-out memory; detect an end-of-packet indicator; determine if the last M received bytes contain data or packet status; and if the last M received bytes contain packet data, issue another request of M bytes to retrieve packet status.

19. The processor of claim 5, wherein the bus interface comprises a hash unit operable to process hash requests from the microengines.

20. The processor of claim 5, wherein the bus interface comprises a plurality of state machines operable to transfer data to and from registers in the microengines.

* * * * *